United States Patent
Kageyama et al.

(10) Patent No.: US 7,437,301 B2
(45) Date of Patent: Oct. 14, 2008

(54) INFORMATION LINKING METHOD, INFORMATION VIEWER, INFORMATION REGISTER, AND INFORMATION SEARCH EQUIPMENT

(75) Inventors: Masahiro Kageyama, Hino (JP); Tomokazu Murakami, Tokyo (JP); Hisao Tanabe, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 453 days.

(21) Appl. No.: 10/942,003

(22) Filed: Sep. 16, 2004

(65) Prior Publication Data

US 2005/0031315 A1 Feb. 10, 2005

Related U.S. Application Data

(63) Continuation of application No. 10/073,975, filed on Feb. 14, 2002, now Pat. No. 6,868,415.

(30) Foreign Application Priority Data

May 11, 2001 (JP) .............................. 2001-141053

(51) Int. Cl.
*G06Q 40/00* (2006.01)
(52) U.S. Cl. ............................... 705/1; 725/38; 348/563
(58) Field of Classification Search ............. 705/30–42, 705/10–44, 1; 348/563, 568; 725/38–40
See application file for complete search history.

(56) References Cited

U.S. PATENT DOCUMENTS

| | | | |
|---|---|---|---|
| 3,597,692 A | | 8/1971 | Fannoy |
| 4,024,508 A | | 5/1977 | Bachman et al. |
| 4,025,901 A | | 5/1977 | Bachman et al. |
| 4,042,912 A | | 8/1977 | Bachman et al. |
| 5,351,075 A | * | 9/1994 | Herz et al. .................... 725/13 |
| 5,630,119 A | | 5/1997 | Aristides et al. |
| 5,842,010 A | | 11/1998 | Jain et al. |
| 5,852,474 A | * | 12/1998 | Nakagaki et al. ............ 348/564 |
| 6,163,795 A | | 12/2000 | Kikinis |
| 6,463,585 B1 | | 10/2002 | Hendricks et al. |
| 6,477,704 B1 | | 11/2002 | Cremia |
| 6,490,724 B1 | | 12/2002 | Ha et al. |

(Continued)

FOREIGN PATENT DOCUMENTS

JP 8-115250 5/1996

(Continued)

*Primary Examiner*—Frantzy Poinvil
(74) *Attorney, Agent, or Firm*—Mattingly, Stanger, Malur & Brundidge, PC

(57) ABSTRACT

On an information registering equipment, content of interest rendered by media, such as a video image of interest distributed by TV broadcasting is captured and displayed. Position/area on the image are defined with a mouse or the like to obtain the target position/area. Information to identify the content is obtained from the TV tuner. Reference information is obtained through input means or by retrieval from the server for reference information. The obtained information specifics are transmitted to an information search equipment that in turn stores then into its database. An information viewing equipment obtains the target position/area and information to identify the content of interest and transmits the thus obtained data to the information search equipment. The information search equipment matches that data with each data record in the database and transmits reference information to the information viewing equipment on which the reference information is displayed.

13 Claims, 16 Drawing Sheets

U.S. PATENT DOCUMENTS

| | | |
|---|---|---|
| 6,539,545 B1 | 3/2003 | Dureau et al. |
| 6,704,931 B1 | 3/2004 | Schaffer et al. |
| 6,721,954 B1 | 4/2004 | Nickum |
| 6,754,905 B2 * | 6/2004 | Gordon et al. ............... 725/38 |

FOREIGN PATENT DOCUMENTS

| | | |
|---|---|---|
| JP | 10-136312 | 5/1998 |
| JP | 2000-165790 | 6/2000 |
| JP | 2001-051926 | 2/2001 |
| JP | 2001-054081 | 2/2001 |
| JP | 2002247490 A * | 8/2002 |

* cited by examiner

FIG.4

DATA RECORD

| DESCRIPTOR (401) (1 BYTE) | CHANNEL (402) (2 BYTES) | TIME WHEN CONTENT WAS BROADCASTED (403) (8 BYTES) | RESERVED (404) (8 BYTES) | RECEIVING AREA (405) (7 BYTES) | TARGET POSITION (406) (4 BYTES) | TARGET AREA (407) (2 BYTES) | RESERVED (408) (384 BYTES) | REFERENCE INFORMATION (409) (96 BYTES) |

(A TOTAL OF 512 BYTES)

DESCRIPTOR(1 BYTE) ="00000000"(FIXED)
BROAD CASTING TIME(8 BYTES) =YEAR(2 BYTES)+MONTH(1 BYTE)+DAY(1 BYTE)+HOUR(1 BYTE)
+MINUTE(1 BYTE)+SECOND(1 BYTE)+FRAME NUMBER(1 BYTE)
RECEIVING AREA(7 BYTES) =ZIP CODE(7 DIGITS)
TARGET POSITION(4 BYTES) =HOR.(2 BYTES)+VERT.(2 BYTES) IN PIXELS
TARGET AREA(2 BYTES) =A RADIUS IN PIXELS FROM THE TARGET POSITION
REFERENCE INFORMATION(96 BYTES) =URL CHARACTER STRING,THE ADDRESS OF HTML DOCUMENT
Ex.http://www.???.co.jp/

CONSISTENCY CHECKING(508)

$(x1-x2)^2+(y1-y2)^2 \leq (r1+r2)^2 \Rightarrow$ CONSISTENT $(x1-x2)^2+(y1-y2)^2 > (r1+r2)^2 \Rightarrow$ INCONSISTENT

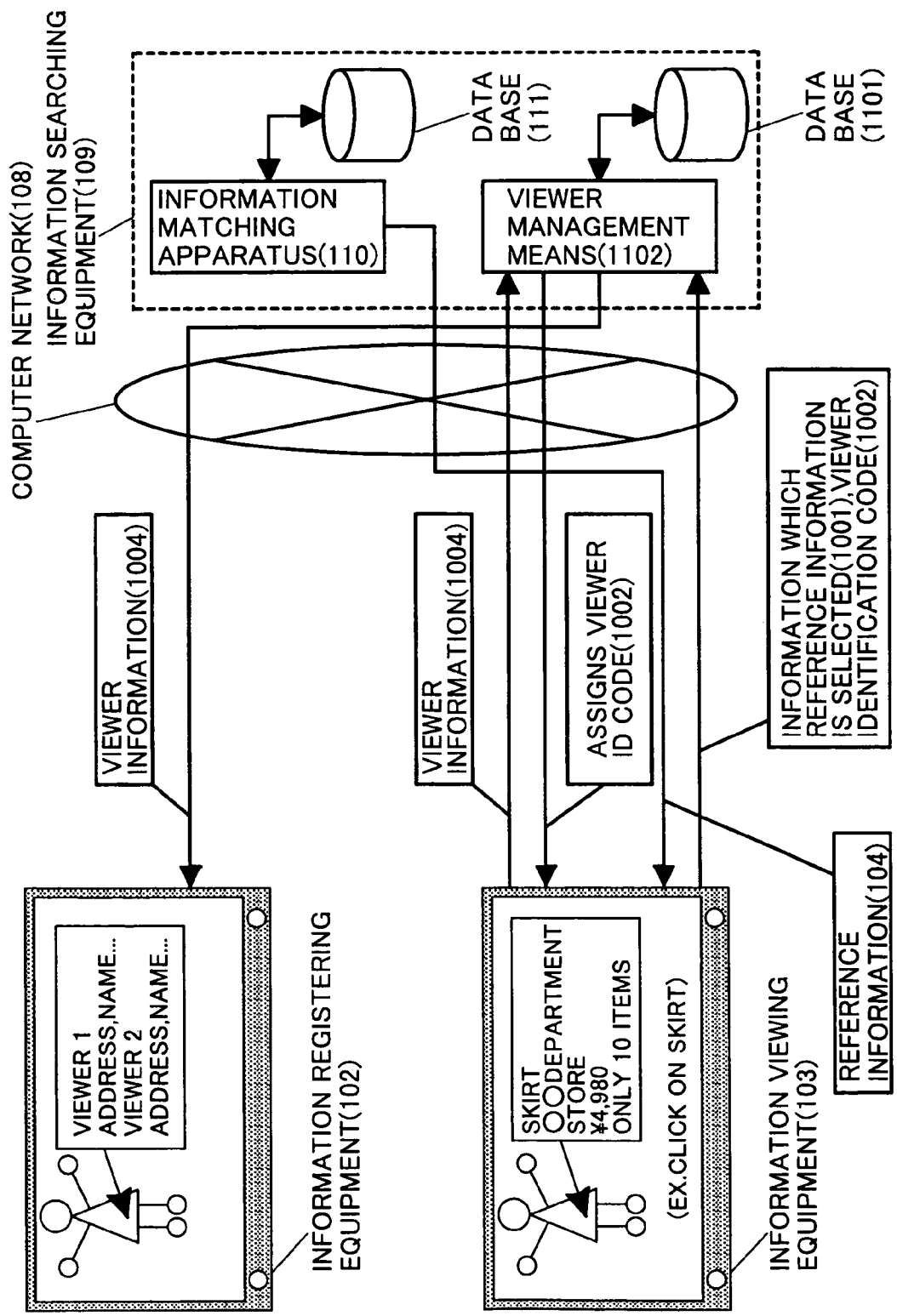

FIG.12

DATA RECORD

| DESCRIPTOR (1201) (1 BYTE) | CHANNEL (402) (2 BYTES) | START TIME (1203) (8 BYTES) | END TIME (1204) (8 BYTES) | RECEIVING AREA (405) (7 BYTES) | TARGET POSITION (406) (4 BYTES) | TARGET AREA (407) (2 BYTES) | RESERVED (408) (384 BYTES) | REFERENCE INFORMATION (409) (96 BYTES) |
|---|---|---|---|---|---|---|---|---|

(A TOTAL OF 512 BYTES)

DESCRIPTOR(1 BYTE) = "00000001"(FIXED)
START TIME(8 BYTES) = YEAR(2 BYTES)+MONTH(1 BYTE)+DAY(1 BYTE)+HOUR(1 BYTE)
 +MINUTE(1 BYTE)+SECOND(1 BYTE)+FRAME NUMBER(1 BYTE)
END TIME(8 BYTES) = YEAR(2 BYTES)+MONTH(1 BYTE)+DAY(1 BYTE)+HOUR(1 BYTE)
 +MINUTE(1 BYTE)+SECOND(1 BYTE)+FRAME NUMBER(1 BYTE)

FIG.13

DATA RECORD

| DESCRIPTOR (1301) (1 BYTE) | (402) | (403) | (404) | (405) | 1ST FRAME INFO(1301) | | | 2ND FRAME INFO(1302) | | RESERVED | REFERENCE INFORMATION (409) (96 BYTES) |
|---|---|---|---|---|---|---|---|---|---|---|---|
| | | | | | TARGET POSITION (1306-1) (4 BYTES) | TARGET AREA (1307-1) (2 BYTES) | | TARGET POSITION (1306-2) (4 BYTES) | TARGET AREA (1307-2) (2 BYTES) | ... | |

(A TOTAL OF 512 BYTES)

DESCRIPTOR(1 BYTE) = "bbbbb010"(bbbbb(BINARY VALUE) DESIGNATES THE NUMBER OF FRAMES)
TARGET POSITION(4 BYTES) = HOR.(2 BYTES)+VERT.(2 BYTES) IN PIXELS
TARGET AREA(2 BYTES) = A RADIUS IN PIXELS FROM THE TARGET POSITION

FIG.14

DATA RECORD

| DESCRIPTOR (1401) (1 BYTE) | (402) | (403) | (404) | (405) | 1ST FRAME INFO(1301) | | | 2ND FRAME INFO(1302) | | BILLING INFORMATION (1408) (24 BYTES) | REFERENCE INFORMATION (409) (96 BYTES) |
|---|---|---|---|---|---|---|---|---|---|---|---|
| | | | | | TARGET POSITION (1306-1) (4 BYTES) | TARGET AREA (1307-1) (2 BYTES) | | TARGET POSITION (1306-2) (4 BYTES) | TARGET AREA (1307-2) (2 BYTES) | ... | |

(A TOTAL OF 512 BYTES)

DESCRIPTOR(1 BYTE) = "bbbbb110"(bbbbb(BINARY VALUE) DESIGNATES THE NUMBER OF FRAMES)
BILLING INFORMATION(24 BYTES) = ACCOUNT NUMBER(1410)(10 BYTES)+REGISTERING FEE(1411)(3 BYTES)
+VIEWING FEE(1412)(3 BYTES)+TERM OF VALIDITY(1413)(8 BYTES)

US 7,437,301 B2

INFORMATION LINKING METHOD, INFORMATION VIEWER, INFORMATION REGISTER, AND INFORMATION SEARCH EQUIPMENT

This is a continuation application of U.S. Ser. No. 10/073,975, filed Feb. 14, 2002 now U.S. Pat. No. 6,868,415.

BACKGROUND OF THE INVENTION

The present invention relates to a method for linking a video image rendered by TV broadcasting and other means to information related to the video image and an information viewer, information register, information search equipment and billing method, based on such method.

On a computer network called the Internet, previously stored information is accessible over the network and can be retrieved and rendered from the World Wide Web (WWW) which would be regarded as a huge information database system wherein related information is linked together.

For building a Web site on the WWW, a method that will be described below is generally used. Information such as text, sound and images is linked by means of a hypertext language called HTML (Hyper Text Markup Language) and described as information items on a Web page (home page) of a Web site and information as tags specifying hyperlinks to other Web pages is also described in HTML on the Web home page.

Not only bushiness users, but also general personal users can gain access to Web sites and pages by using browsing software (hereinafter referred to as a browser) run on a personal computer (PC). For improving user facilities, such a search service (hereinafter referred to as a directory service) is provided on the WWW that enables ready access to target information on a Web site/page, according to a keyword or the like entered.

With digital broadcasting using broadcasting satellites, it is possible that a plurality of information contents are linked up and that a TV program and information distributed on the Internet are linked up by using scripting languages as extensions of the HTML function for broadcasting, such as BML (Broadcast Markup Language), B-XML (Broadcast eXtensible Markup Language), and B-HTML (Broadcast HTML). Information described in these scripting languages is transmitted to users by means of framing such as standardized data broadcasting.

SUMMARY OF THE INVENTION

If users (audience of TV programs) should use a function that enables the user, by selecting a part or all of a video image displayed on a TV receiver when watching a TV program, to obtain information related to the video image, it would be convenient for them. For example, if the audience should select (click) a costume that an actress wears who acts the heroine of a drama program on the air with a pointing device such as a mouse, reference information related to the costume, such as its supplier name and price, would be displayed on the TV monitor screen. To realize this function, however, we would be confronted with the following problems:

A first problem is how to link a video image to its reference information. Conventional search engines for the above-mentioned directory service perform search, based on a keyword entered. To apply such engines, it is necessary to convert the video image to a keyword; for example, in the above costume example, the name of the costume and its supplier name must be obtained from the video image. This is generally difficult in most cases. Thus, it is necessary to provide a new information linking method that enables the video image of interest to directly link to its reference information.

A second problem is how to provide an information registering equipment for making the above new information linking method practicable; that is, equipment that enables the provider of information related to the video image of interest (who is hereinafter referred to as the registrar) to link the video image to its reference information by easy operation.

A third problem is-how to provide an information viewing equipment for making the above new information linking method practicable; that is, equipment that enables the information viewer to view the reference information by selecting a part or all of the video image of interest.

A fourth problem is how to provide an information search equipment for making the above new information linking method practicable; that is, equipment that is able to search for target information registered thereon, according to the search request from the above information viewing equipment and transmit the result of search to the information viewing equipment.

A fifth problem is how to provide a new billing method for making the service of linking the video image of interest to its reference information feasible as a business.

With the aim of solving the foregoing problems, the object of the present invention is to provide an information linking method, information viewing apparatus, information registering apparatus, information search apparatus, and billing method.

In order to solve the foregoing problems and in accordance with one aspect of the present invention, the invention provides an information linking method for linking content of interest rendered by media to information related to the content of interest (this information is hereinafter referred to as reference information), using an information registering equipment, an information viewing equipment, an information search equipment, and a computer network. This information linking method comprises the steps wherein the information registering equipment transmits a set of first content-identifying information to identify the content of interest and the reference information across the computer network to the information search equipment; the information search equipment registers the received set of the first content-identifying information and the reference information into a database; the information viewing equipment transmits second content-identifying information to identify the content of interest across the computer network to the information search equipment; and the information search equipment matches the received second content-identifying information with the first content-identifying information registered in the database and, if there is a match, transmits the reference information from the set in which the reference information joined with the first content-identifying information across the computer network to the information viewing equipment.

In the foregoing description of the information linking method, the content of interest rendered by media is information comprising an image. In this aspect, the information linking method comprises the steps wherein the information registering equipment transmits first target-defining information that designates a part or all of the image in conjunction with the first content-identifying information across the computer network to the information search equipment; the information search equipment registers the received first content-identifying information, first target-defining information, and the reference information in a set into the database; the information viewing equipment transmits second target-defining information that designates a part or all of the image in conjunction with the second content-identifying information across the computer network to the information search equipment; and the information search equipment matches the received second content-identifying information with the first content-identifying information registered in the database and the received second target-defining information with the first target-defining information registered in the database and, if there are matches for both couples of information, transmits the reference information from the set in which the reference information joined with the first content-identifying information and first target-defining information across the computer network to the information viewing equipment.

In the foregoing description of the information linking method, the content of interest rendered by media is video image information distributed by TV broadcasting and the content-identifying information includes a broadcasting channel number over which and time when the content was or will be broadcasted by the TV broadcasting, and moreover, a receiving area if the TV broadcasting is local TV broadcasting (restricted area broadcasting).

In the foregoing description of the information linking method, the reference information includes a URL (Uniform Resource Locator) that designates a Web site/page on the Internet.

According to another aspect of the present invention, the invention provides an information viewing equipment which links content of interest rendered by media to its reference information. This information viewing equipment comprises means for capturing the content of interest; means for obtaining content-identifying information to identify the content of interest from the captured content of interest; means for transmitting the content-identifying information over a computer network; means for receiving the reference information over the computer network; and means for outputting the received reference information.

In the foregoing description of the information viewing equipment, the content of interest rendered by media is video image information distributed by TV broadcasting and the means for obtaining content-identifying information is to obtain at least a broadcasting channel number over which and time when the content was or will be broadcasted, and moreover, a receiving area if the TV broadcasting is local TV broadcasting (restricted area broadcasting).

The information viewing equipment further comprises means for obtaining target-defining information that designates a part or all of a video image of interest distributed by the TV broadcasting and means for transmitting the target-defining information joined with the content-identifying information over the computer network.

The information viewing equipment further comprises a time-shifting apparatus for recording and reproducing the content of interest.

According to yet another aspect of the present invention, the invention provides an information registering equipment which links content of interest rendered by media to its reference information. This information registering equipment comprises means for capturing the content of interest; means for obtaining content-identifying information to identify the content of interest; means for obtaining reference information to join with the content-identifying information; and means for transmitting a set of the content-identifying information and the reference information over a computer network.

In the foregoing description of the information registering equipment, the content of interest rendered by media is video image information distributed by TV broadcasting and the means for obtaining content-identifying information is to obtain at least a broadcasting channel number over which and time when the content was or will be broadcasted, and moreover, a receiving area if the TV broadcasting is local TV broadcasting (restricted area broadcasting).

The information registering equipment further comprises means for obtaining target-defining information that designates a part or all of a video image of interest distributed by the TV broadcasting and means for transmitting the target-defining information joined with the content-identifying information and the reference information over the computer network.

The information registering equipment further comprises a time-shifting apparatus for recording and reproducing the content of interest.

According to a further aspect of the present invention, the invention provides an information search equipment which searches for reference information linked with content of interest rendered by media. This information search equipment comprises means for inputting a set of first content-identifying information and reference information received over a computer network; recording means for storing the set of the first content-identifying information and the reference information into a database; means for inputting second content-identifying information received over the computer network; an information matching apparatus for comparing the first and second content-identifying information specifics for matching; and means for transmitting the reference information from the set in which the reference information joined with the first content-identifying information across the computer network to the sender of the second content-identifying information (the sender is hereinafter referred to as a viewer) if there is a match as the result of the matching.

In the foregoing description of the information search equipment, the content of interest rendered by media is video image information distributed by TV broadcasting. In this aspect, the information search equipment includes means for inputting first target-defining information received over the computer network, the first target-defining information designating a part or all of a video image of interest distributed by the TV broadcasting, wherein the recording means stores the first target-defining information and the first content-identifying information in a set into the database. The information search equipment further includes means for inputting second target-defining information received over the computer network, the second target-defining information designating a part or all of a video image of interest distributed by the TV broadcasting. The information matching apparatus compares the first and second target-defining information specifics as well as the first and second content-identifying information specifics for matching.

The information search equipment further comprises means for controlling its operation such that, if there is a mismatch as the result of comparing the first and second content-identifying information specifics, the information search equipment sends the viewer notice that reference information matching the target of search is not yet registered as the result of search for matching.

The information search equipment further comprises means for storing information about the sender of the second content-identifying information (in other words, the viewer) into the database and means for transmitting the information about the viewer across the computer network to the sender of the first content-identifying information if there is a match as the result of comparing the first and second content-identifying information specifics.

These and other objects, features and advantages of the present invention will become more apparent in view of the following detailed description of the preferred embodiments in conjunction with accompanying drawings.

BRIEF DESCRIPTION OF THE DRAWINGS

FIG. 4 illustrates a data record example used for information search according to the present invention.

FIG. 11 shows a system structural diagram of illustrative embodiment of implementing the post-processing of information linking operation according to the present invention.

FIG. 12 illustrates another example of a data record used for information search according to the present invention.

FIG. 13 illustrates yet another data record example used for information search according to the present invention.

FIG. 14 illustrates a further data record example used for information search according to the present invention.

DESCRIPTION OF THE PREFERRED EMBODIMENTS

With reference to the accompanying drawings, preferred embodiments of the present invention will be described below.

Figure 1:
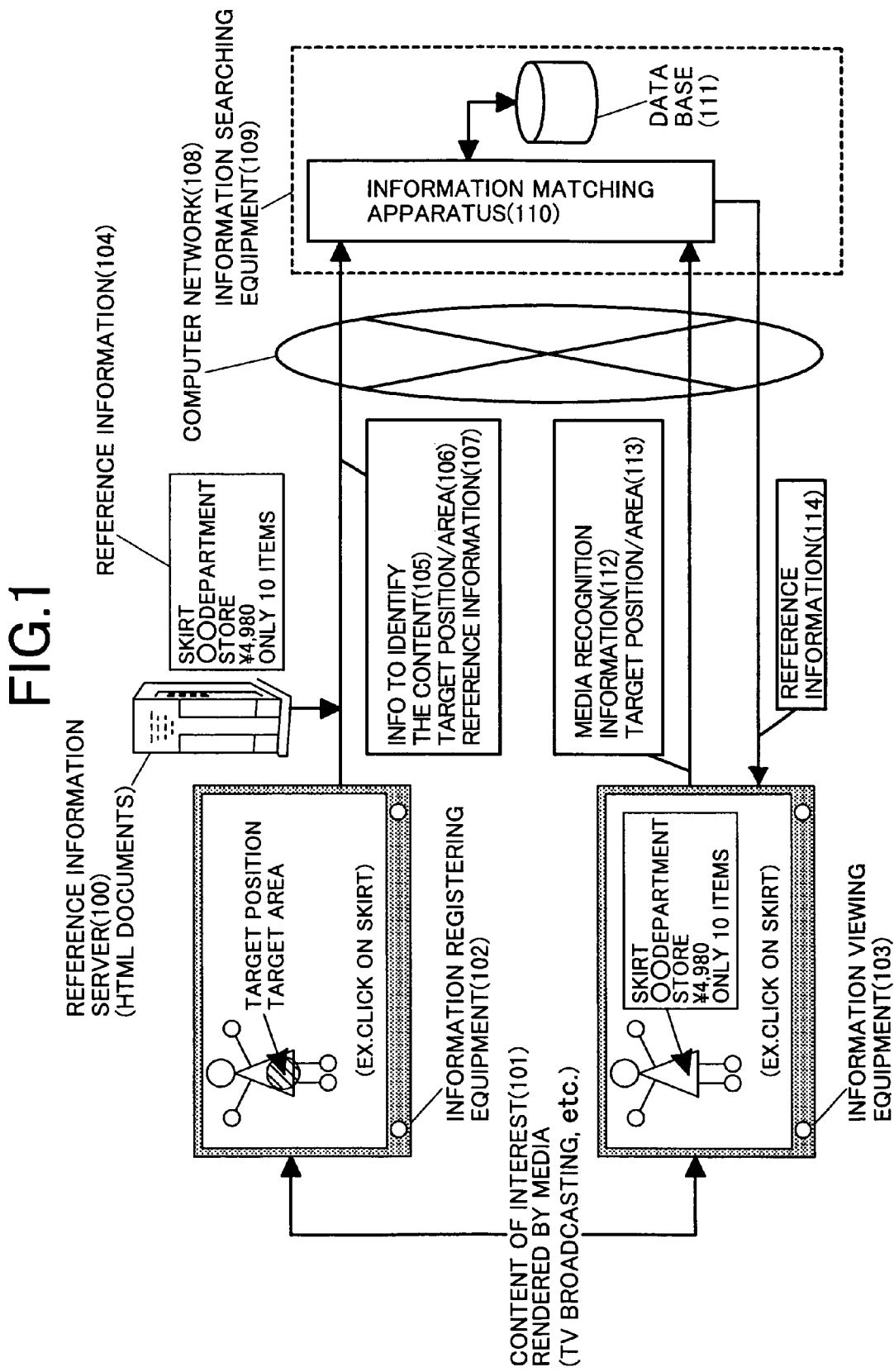
FIG. 1 shows a schematic structural drawing of a preferred embodiment of the present invention.

FIG. 1 shows a schematic structural drawing of a preferred embodiment of the present invention.

First, content of interest (101) rendered by media is input to both an information registering equipment (102) and an information viewing equipment (103). This content of interest is the same input for both equipments.

This content of interest (101) corresponds to a keyword for an information registration and retrieval system. It may be any distinguishable one for both equipments independently (that is, it is distinguishable from another content rendered by media), such as a video image of a TV broadcast and an image from a Web site/page on the Internet.

If, for example, the content is rendered by TV broadcasting, as information to identify (105) the content of interest (101), the following may be used: broadcast channel number, time when the content was broadcasted (year, month, day, hours, minutes, seconds, frame number, etc.), receiving area (in the case of local TV broadcasting), etc. These specifics are obtained from the tuner of a TV receiver. If the content is rendered from a Web site/page on the Internet, URL (Uniform Resource Locator) is used, instead.

On the assumption that content of interest (101) is rendered by TV broadcasting, operation according to the preferred embodiment will be explained below.

On the information registering equipment (102) shown in FIG. 1, the content of interest (101) is displayed and a video image reproduced from the content of interest (101) is linked to reference information (104) stored in a form such as a text document and HTML document on a reference information server (100) that is provided internally in the same registering equipment or as an external equipment.

During this operation, on the displayed image, target position/area are defined with a coordinates pointing device (such as a mouse, tablet, pen, remote controller, etc.) included in the information registering equipment (102).

As an example, defining target position/area by clicking on a skirt in the displayed image is represented in FIG. 1.

The information registering equipment (102) transmits data consisting of the information to identify (105) the content of interest (101), the thus defined target position/area (106), and reference information (107) to which the content is desired to link across a computer network (108) to an information search equipment (109).

Hereon, the reference information (107) may be the same as the reference information (104) stored in the reference information server (100). If the content is to link to an open HTML document or the like on a Web site/page accessible over the Internet, the reference information (107) may be a character string of URL (for example, http://www.???.co.jp/) that designates the address where the document exists. The character string of URL may be entered by the input means of the information registering equipment (102). If the reference information is a text document or the like, its designator may be entered by the input means, similarly.

On the other hand, on the information viewing equipment (103), similarly, the content of interest (101) is displayed. On the displayed image, target position/area are defined with a coordinates pointing device included in the information viewing equipment (103). Searching for reference information (114) linked to the defined target position/area and outputting (presenting) the reference information are tried.

During this operation, as is the case for the information registering equipment (102), the information viewing equipment (103) generates data consisting of the information to identify (112) the content of interest (101) and the thus defined target position/area (113) and transmits the data across the computer network (108) to the information search equipment (109), then waits for results of search to be returned from the information search equipment (109).

The information search equipment (109) shown in FIG. 1 is comprised of an information matching apparatus (110) and a database (111). The information search equipment (109) registers the data consisting of the information to identify (105) the content of interest, the defined target position/area (106), and reference information (107) to which the content is desired to link, received from the information registering equipment (102), into the database (111) as a data record. At the same time, the information matching apparatus (110) searches the database (111) for a data record that matches with the data consisting of the information to identify (112) the content of interest (101) and the defined target position/area (113) received from the information viewing equipment (103). If there are matches between both the couple of the information to identify the content (105) (112) and between the couple of the defined target position/area (106) (113), the registered reference information (107) (if there are a plurality of items of this information, a block of items) will be transmitted as the reference information (114) across the computer network (108) to the information viewing equipment (103).

Data record examples and operation of the information matching apparatus (110) will be explained later.

As the information matching apparatus (110) and the database (111), a general database server can be used, and therefore a detailed drawing thereof is not shown.

On the information viewing equipment (103), the reference information (114) received from the information search equipment (109) is presented on its display, thereby linking of target content and related information is implemented. An example of the reference information (114) will be explained later.

Figure 2:
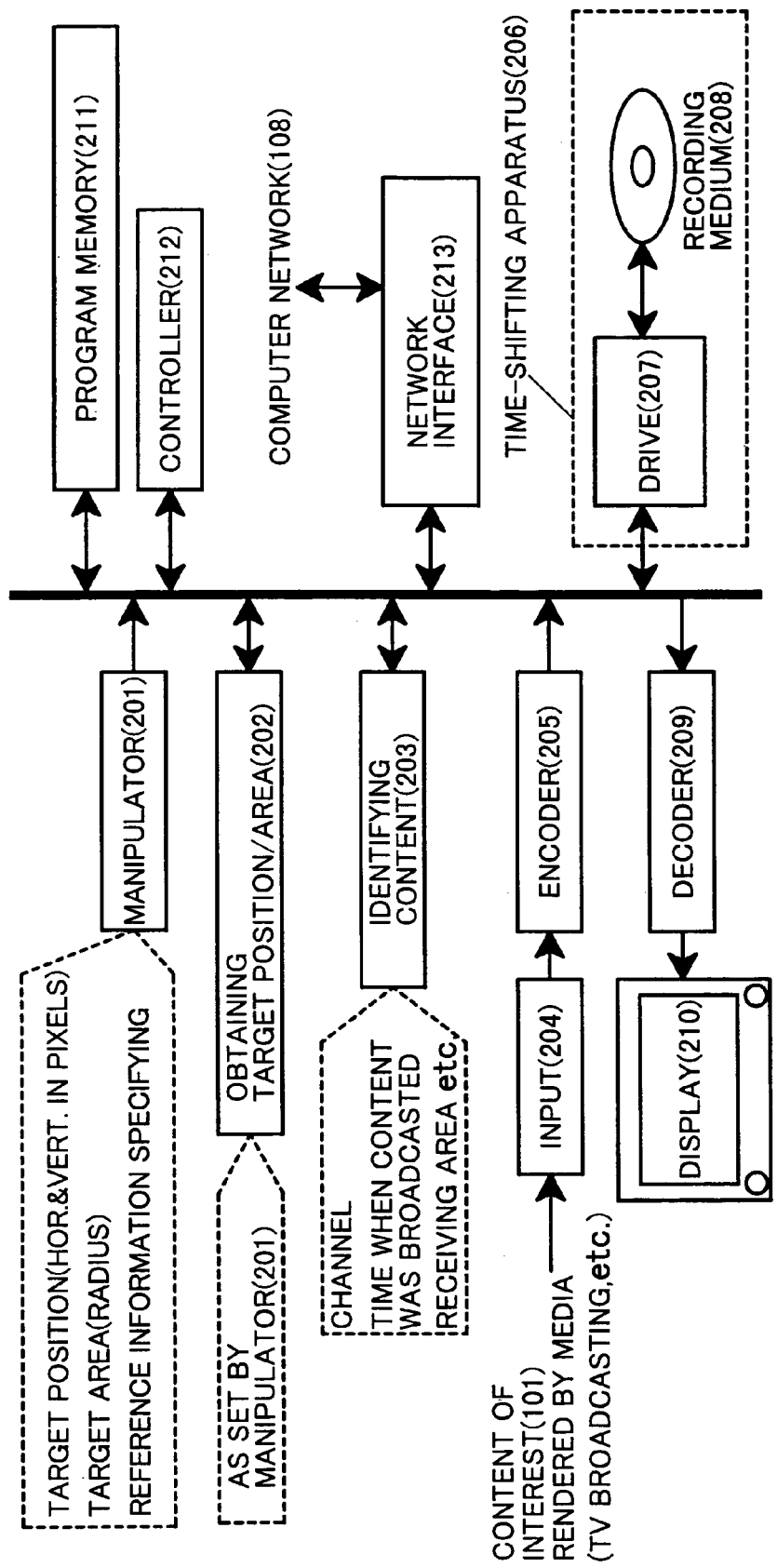
FIG. 2 shows a structural drawing of an information registering equipment (102) and an information viewing equipment (103) embodied according to the preferred embodiment of the present invention.

FIG. 2 shows a detailed structural drawing of the information registering equipment (102) and the information viewing equipment (103). The information registering equipment (102) and the information viewing equipment (103) can be embodied in substantially the same structure. Based on the instructions of a software program comprising the steps which will be described later, stored in a program memory (211), a controller (212) controls the overall operation of the equipment.

When the content of interest (101) rendered by media is supplied through the input (204), it is first encoded to digital data by an encoder (205) under the controller (212).

For this encoding, methods in compliance with the ISO/IEC standards, such as Moving Picture Experts Group (MPEG) and Joint Photographic Experts Group (JPEG), and moreover, Pulse Coded Modulation (PCM) that is a simple binary coding method are applicable. Because any of the commonly well-known methods can be used for encoding, a drawing thereof is not shown. During encoding, not only video signals, but also audio signals may be encoded in the same way.

Encoded signals are decoded by a decoder (209) when information is presented on the display (210). In addition to decoding the encoded video/audio signals, the decoder is capable of interpreting and visualizing an HTML document or the like to display the reference information (114) which will be explained later. The equipment configuration may include a time-shifting apparatus (206) into which the output from the encoder (205) is stored once. After a certain time interval, the time-shifting apparatus outputs the encoded data to the decoder (209).

The time-shifting apparatus (206) is comprised of a recording medium (208) and a drive (207) for recording/reproducing data by driving the medium.

As the recording medium (208), a disc-form medium as shown (for example, a compact disc (CD), digital versatile disc (DVD), magneto-optical (MO) disc, floppy disc (FD), hard disc (HD)) may be used. In addition, a tape-form medium (such as videocassette tape) and a solid-state memory (such as a flash memory) may be used.

Because the time-shifting apparatus (206) can be embodied by the use of a general recording apparatus as is, the drawing thereof is not shown. How to use the time-shifting apparatus (206) will be explained later.

As for the input (204) and display (210), the corresponding functions of other devices can be used instead of them (that is, they can be provided as attachments) Therefore, they may be excluded from the configuration of the information registering equipment (102) and the information viewing equipment (103).

Means for identifying content (203) shown in FIG. 2 obtains and retains information for identifying the content of interest (101) (channel, time when content was broadcasted, receiving area, etc.), based on the data entered through the input (204) which will be explained later.

If the time-shifting apparatus is used, when video/audio signals are recorded, the information to identity the content can also be recorded. When reproduction is performed, the information is transferred from the time-shifting apparatus to the means for identifying content (203).

A manipulator (201) shown in FIG. 2 allows the user to define the target position (horizontal and vertical positions in pixels) and the target area (within a radius from the target position) on the image presented on the display (210), the image to which reference information is desired to link or whose reference information is desired to be retrieved, based on the coordinates data furnished with the pointing device which will be explained later. In the case of the information registering equipment (102), the manipulator allows for specifying the reference information (104) (107) (input via the keyboard, dragging and dropping the label or the like of an HTML document, and so on). Then, means for obtaining target position/area (202) encodes the data on the target position/area set by the manipulator (201) and retains the encoded data. If the time-shifting apparatus (206) is used, defining the target position/area and specifying the reference information may be carried out when video/audio signals are reproduced.

The operation of a network interface (213) shown in FIG. 2 will be described below.

The information registering equipment (102) transmits the information to identify (105) the content of interest retained by the means for identifying content (203), the target position/area (106) retained by the means for obtaining target position/area (202), and the reference information (104) (107) specified by the manipulator (201) over the computer network (108). On the other hand, the information viewing equipment (103) transmits the information to identify (112) the content of interest retained by the means for identifying content (203) and the target position/area (113) retained by the means for obtaining target position/area (202) over the computer network (108) and waits for results of search returned. When results of search are returned from the information search equipment over the computer network (108), the information viewing equipment (103) presents the results on the display (210). In either case, the network interface (213) only provides the functions of transmitting and receiving commands and data over the computer network (108) to/from the information search equipment. Because the network interface (213) can be embodied by the use of a network interface board or-the like for general PCs, a drawing thereof is not shown.

Figure 3:
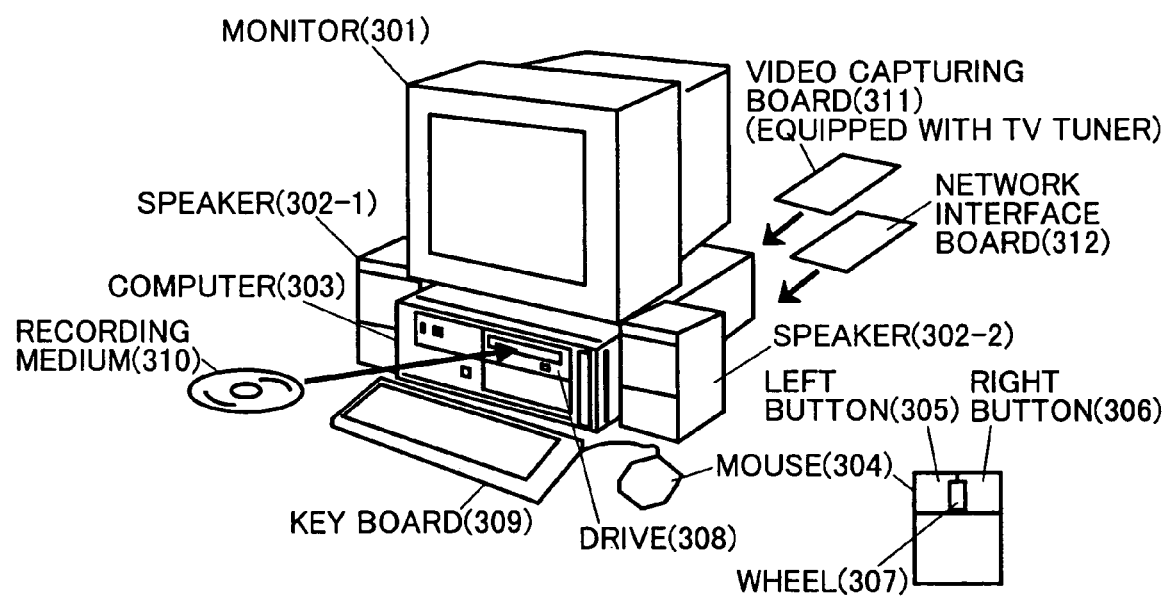
FIG. 3 shows a structural drawing in another form of the information registering equipment (102) and the information viewing equipment (103) embodied according to the preferred embodiment of the present invention.

FIG. 3 shows a structural drawing in another form of the information registering equipment (102) and the information viewing equipment (103).

FIG. 3 illustrates an example of general PC-form embodiment of the configuration of the information registering equipment (102) and the information viewing equipment (103) shown in FIG. 2. The equipment is comprised of a monitor (301), speakers (302-1) (302-2), a computer (303), mouse (304), drive (308), recording medium (310), keyboard (309), video capturing board (311), and network interface board (312).

By contrast with the configuration shown in FIG. 2, the equipment shown in FIG. 3 is configured with the mouse (304) and keyboard (309) in place of the manipulator (201), the video capturing board (311) in place of the input (204), encoder (205), and decoder (209), the monitor (301) and speakers (302-1) (302-2) in place of the display (210), the drive (308) in place of the drive (207), the recording medium (310) in place of the recording medium (208), and the network interface board (312) in place of the network interface (213). Instead of the means for obtaining target position/area (202) and the means for identifying content (203), the main memory built in the computer (303) is used to retain the results of operations executed by the controller (212). As the user moves the mouse (304), the cursor shown on the monitor (301) moves to a desired place. By pressing, for example, the left button (305) of the mouse, the target position is defined. Defining the target area can be performed as follows. Move the wheel (307) of the mouse forward (up) to extend the area and move the wheel backward (down) to diminish the area. The right button (306) of the mouse may be used to display help for explaining operation.

The video capturing board (311) is equipped with a TV tuner function so that channel selection and tuning can be performed under the software control from the computer (303). Thus, the information to identify (105) (112) the content of interest can be obtained easily. Other forms of equipment configuration than the one shown in FIG. 3 include a TV receiver or the like into which the functions shown in FIG. 2 are incorporated.

FIG. 4 illustrates a data record example used for information search according to the present invention. This exemplary data record is stored into the database 111 in the information search equipment (109) shown in FIG. 1.

The data record consists of fixed-length data which is, for example, a total of 512 bytes. The record has the fields of descriptor (401), channel (402), time when content was broadcasted (403), receiving area (405), target position (406), target area (407), and reference information (409). The reserves fields (404) (408) are provided for future extension of function. The data size of the fields and the total data size are illustrative for operation explanation that will be given below and are not limited to the size given in FIG. 4 and variable-length data fields rather than the fixed-length ones may be applied.

In FIG. 4, the descriptor (401) is data indicating that the contents and formats of the fields that follow are those specified in FIG. 4; it is set at, for example, a binary value of "00000000" (fixed). If the contents and formats of the fields that follow the descriptor (401) differ from those specified in FIG. 4, a different value of the descriptor is set. In the fields of channel (402), time when content was broadcasted (403), receiving area (405), the contents of the information to identify (105) the content of interest, which have been received from the information registering equipment (102), are stored as is. In the fields of target position (406) and target area (407), the target position/area (106), which have been received from the information registering equipment (102), are stored as is. In the field of reference information (409), the reference information (107), which has been received from the information registering equipment. (102), is stored as is. The record may include a field to contain the information registrar ID code or the like, which is not shown in FIG. 4.

Figure 5:
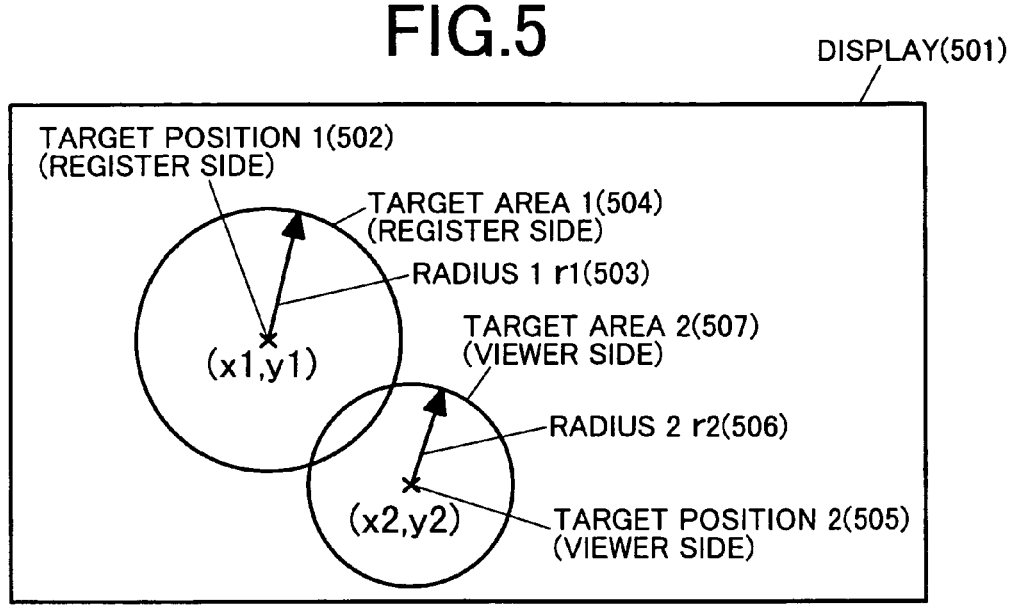
FIG. 5 illustrates an example of matching operation by an information matching apparatus (110) used in the present invention.

FIG. 5 illustrates an example of matching operation by the information matching apparatus (110) shown in FIG. 1

For the data records stored in the form shown in FIG. 4 in the database (11), the information matching apparatus (110) compares their contents with the information to identify (112) the content of interest and the target position/area (113) received from the information viewing equipment (113) for matching. If a data record that matches with both items is found, the reference information (409) stored in the data record is transmitted to the information viewing equipment (103). During this comparison, as for the information to identify the content of interest, if the data specifics received from the information viewing equipment are completely identical to those in the appropriate data fields of a data record, it is judged that there is a "match."

For comparison in terms of the target position/area, on the other hand, whether there is a match is judged by, for example, a consistency check method that is described below. First, on an assumptive display (501), the target position (406) stored in a data record, shown in FIG. 4, is assumed to be target position 1 (502) with its two-dimensional coordinates (x1, y1). The target area (407), stored in the data record is assumed to be target area 1 (504) with its radius being radius 1, r1. Similarly, the target position/area (113) received from the information viewing equipment (103) are assumed to be target position 2 (505) with its two-dimensional coordinates (x2, y2) and target area 2 (506) with its radius being r2.

At this time, if the assumptive circles of both areas are overlapped even in part, it is judged that there is a "match"; that is, both are consistent.

Specifically, see an example of consistency checking (508) in FIG. 5. Here, comparison is made between squared values that represent the distance between target position 1 and target position 2 (left-hand member of inequalities (508)) and a squared value that represents the sum of radius 1 and radius 2 (right-hand member of inequalities (508)). If the left-hand member equals to or smaller than the right-hand member, it is judged that both are consistent. If the left-hand member is greater than the right-hand member, it is judged that both are inconsistent. This judgment can easily be implemented by simple arithmetic circuits and a comparator whose illustrative drawings are not shown.

There is a possibility that the information registering equipment (102) and information viewing equipment (103) have different display screen dimensions in which the same content of interest (101) is presented. Accordingly, the above two-dimensional coordinates $(x_1, y_1)$ and $(x_2, y_2)$ and radii $r_1$ and $r_2$ may be normalized to the display screen size of each equipment, that is, these values are divided by the vertical and horizontal dimensions of the screen and the obtained values be used.

Figure 6:
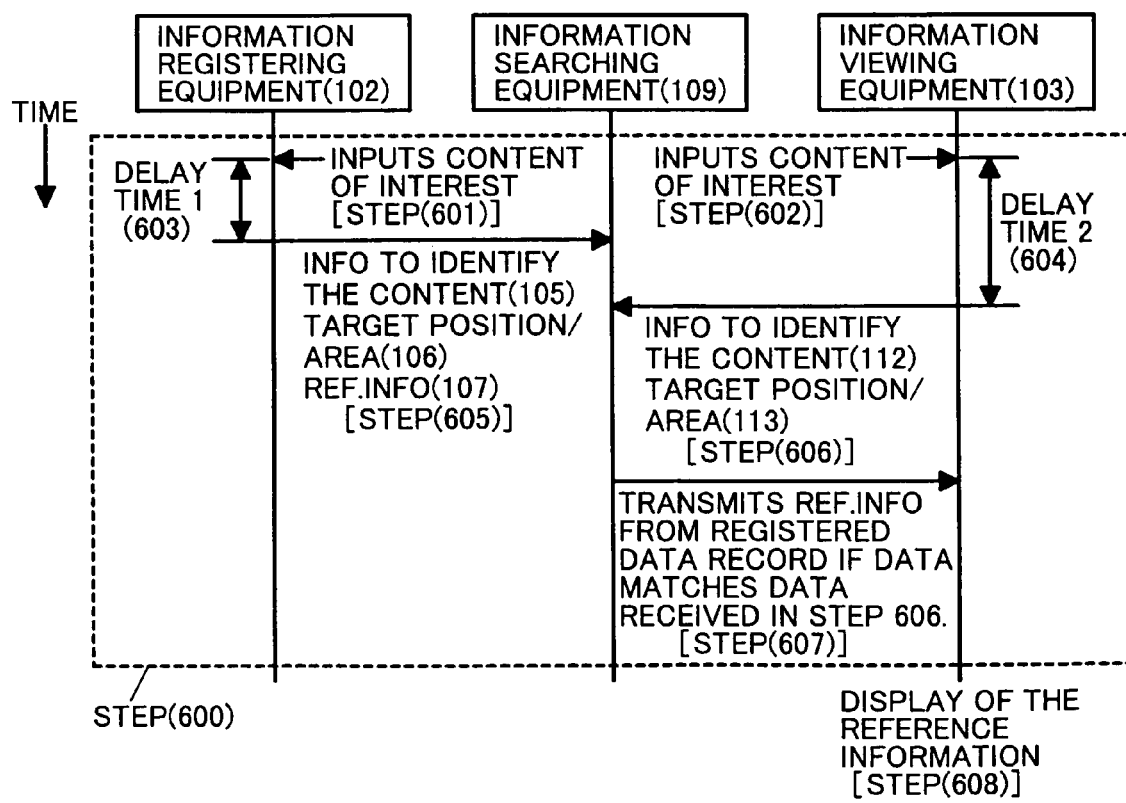
FIG. 6 illustrates an example of information linking operation according to the present invention.

FIG. 6 illustrates an example of information linking operation according to the present invention.

FIG. 6 represents the actions of the information registering equipment (102), information search equipment (109), and information viewing equipment (103) shown in FIG. 1 as steps (600) that are carried out with time lags. First, in steps (601) and (602), the same content of interest (101) rendered by media is input to the information registering equipment (102) and information viewing equipment (103) at the same time. This does not mean that the content of interest (101) is input only at this moment. In other words, during continuos rendering of content by media, when the content of interest (101) may be captured and input at any time, the image display content at this moment is input for the process for registering and viewing of reference information. At this time, a finite processing time is required for registering and viewing the reference information. In particular, in cases where recording/reproducing are performed with the above-mentioned time-shifting apparatus (206), the time allowed for processing may be very long; e.g., a few days or longer.

Thus, generally, there occurs some difference between delay time 1 (603) after the input of the content of interest (101) to the information registering equipment (102) in step (601) until transmitting the information to identify (105) the content of interest, target position/area (106), and reference information (107) in step (605) and delay time 2 (604) after the input of the content of interest (101) to the information viewing equipment (103) in step (602) until transmitting the information to identify (112) the content of interest and target position/area (113) in step (606).

In FIG. 6, the actions proceed, assuming that delay time 1 (603) is shorter than delay time 2 (604), that is, the process of registering information is completed before the process of viewing the reference information. In this case, on the information search equipment (109), for all data records stored in its database (111), their data contents are compared one by one with the data received in step (606) for matching, according to the above-described method of matching. If a registered data record matches the data received, in step (607), the information search equipment (109) transmits the reference information (114) derived from the data record to the information viewing equipment (103). Then, the reference information (114) can be displayed in step (607).

Figure 7:
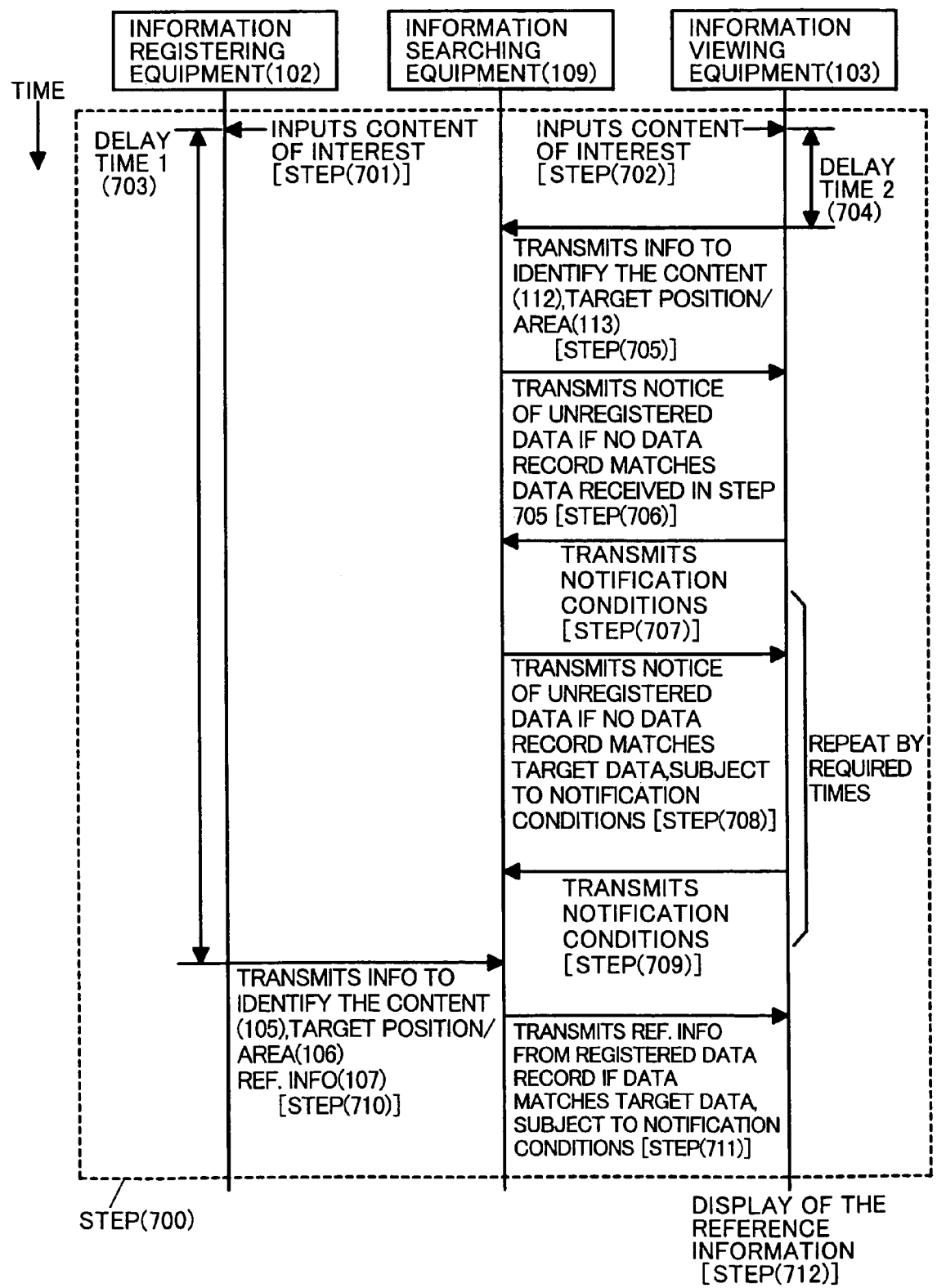
FIG. 7 illustrates another example of information linking operation according to the present invention.

FIG. 7 illustrates another example of information linking operation according to the present invention.

FIG. 7 represents the actions of the information registering equipment (102), information search equipment (109), and information viewing equipment (103) shown in FIG. 1 as steps (700) that are carried out with time lags. Inversely to the case in FIG. 6, by comparison of delay time 1 after the input of the content of interest (101) to the information registering equipment (102) in step (701) until transmitting the information to identify (105) the content of interest, target position/area (106), and reference information (107) in step (710) and delay time 2 (704) after the input of the content of interest (101) to the information viewing equipment (103) in step (702) until transmitting the information to identify (112) the content of interest and target position/area (113) in step (705). the actions in FIG. 7 proceed, assuming that delay time 1 (703) is longer than delay time 2 (704), that is, the process of registering information is not completed before the process of viewing the reference information.

In this case, on the information search equipment (109), for all data records stored in its database (111), even if their data contents are compared with the data received in step (705) for matching, no data record that matches the received data is found. Thus, in step (706), the information search equipment (109) transmits notice of unregistered data (801), which will be explained later, to the information viewing equipment (103). At this time, the notice of unregistered data (801) may be transmitted by e-mail or the like.

Figure 8:
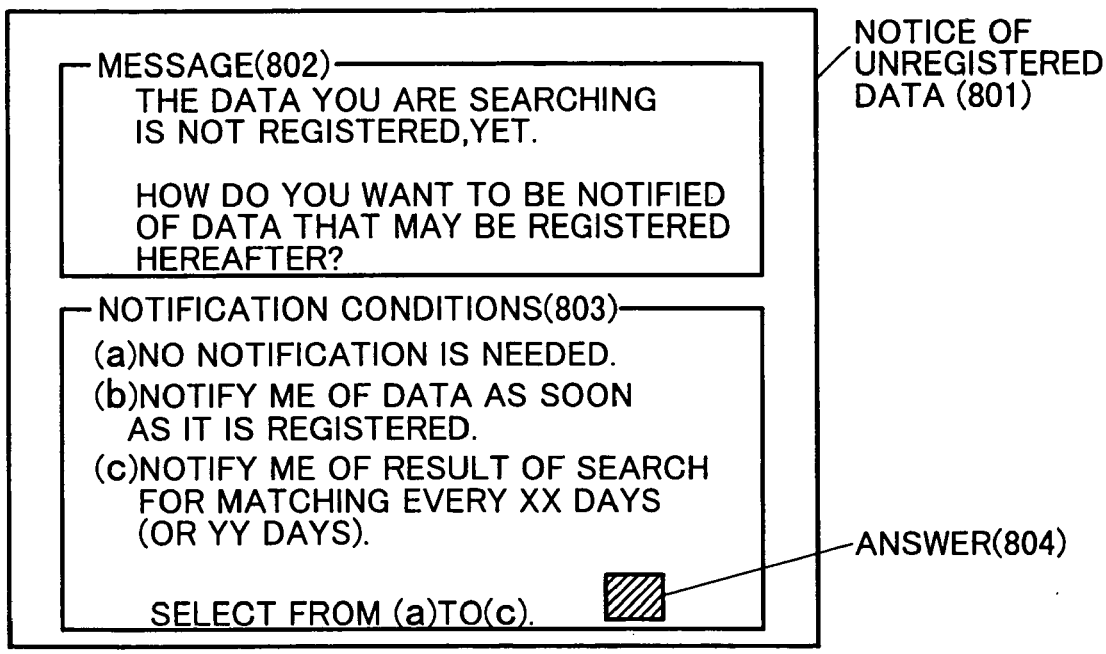
FIG. 8 illustrates an information example that is displayed on the information viewing equipment (103) of the present invention.

FIG. 8 illustrates an example of notice of unregistered data (801) that is presented on the display of the information viewing equipment (103).

As shown in FIG. 8, the notice of unregistered data 801 consists of a message (802) that data for which you are finding is not registered yet and notification conditions (803) in which the user is allowed to specify how the user will be notified of the data that may be registered hereafter.

The notification conditions (803) include options, for example, (a) no notification is needed even if data is registered hereafter, (b) notify me of the data as soon as it is registered, and (c) notify me of the result of search for matching every XX days or YY hours (where XX and YY are numbers). The user can select the appropriate one out of these options and enter it in the answer field (804).

The information viewing equipment (103) transmits the notification conditions (803) with a value entered in the answer field (804) to the information search equipment (109) in step (707) in FIG. 7.

If the option "(b) notify me of the data as soon as it is registered" has been set as the user preference on the notification conditions (803), the above-described matching is performed each time new information is transmitted from the information registering equipment (102) and registered into the database of the information search equipment (103). When data is transmitted in step (710) in FIG. 7 and registered as a data record that meets the conditions of search, the information search equipment transmits the reference information (114) derived from the data record to the information viewing equipment (103). Then, the reference information (114) can be displayed in step (712).

When transmitting the reference information (114), the information search equipment notifies the user by e-mail that the reference information (114) has been registered. At the same time, the equipment may transmit the reference information (114) as an attachment file to the e-mail. If the option "(c) notify me of the result of search for matching periodically" has been set as the user preference on the notification conditions (803), and if the data records in the database are again compared with the target data for matching, but no data record that matches the target data is found, in step (708) in FIG. 7, the information search equipment re-transmits the notice of unregistered data (801) to the information viewing equipment (103). The information viewing equipment (103) displays the notice of unregistered data (801) and transmits the notification conditions (803) to the information search equipment (109) in step (709).

These steps (708) and (709) are repeated by required times until the option, (a) no notification is needed, has been set as the user preference on the notification conditions (803) or the target information has been registered in step (710). Once the target information has been registered in step (710), the information search equipment (109) can find a data record that meets the conditions of search and thus transmit the reference information (114) derived from the data record to the information viewing equipment (103). Then, the reference information (114) can be displayed in step (712).

Figure 9:
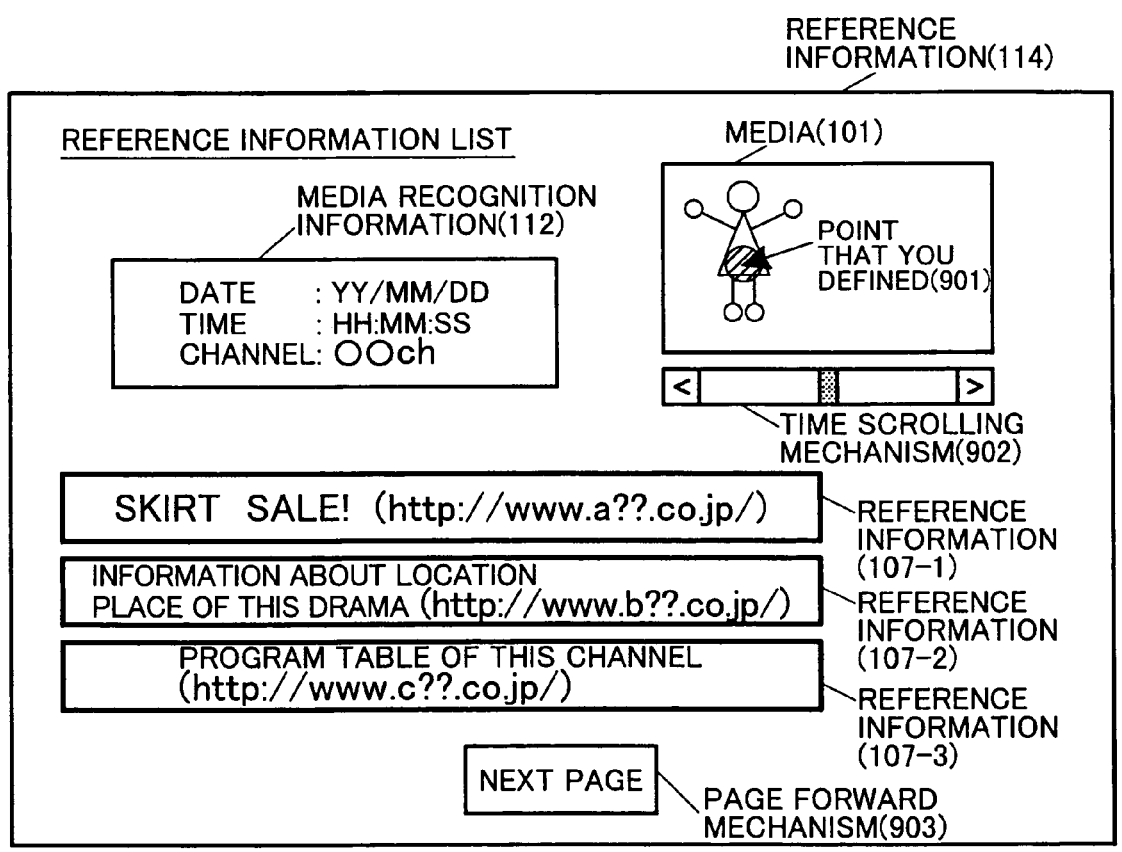
FIG. 9 illustrates another information example that is displayed on the information viewing equipment (103) of the present invention.

FIG. 9 illustrates an example of the reference information (114) displayed on the information viewing equipment (103) of the present invention.

As shown in FIG. 9, the information to identify (112) the content of interest, the content of interest (101) rendered by media, and the defined target position/area (901) are displayed to tell the viewer what content of interest for which its reference information has been searched.

With this display, a time scrolling mechanism (902) may be employed so that a scene (motion video sequence) in several seconds before and after the specified point (time) can be displayed, which enables the viewer to recall the scene of interest more definitely and recognize the search of its reference information. The motion video sequence can be read from the above-mentioned time-shifting apparatus (206).

Reference information items (107-1) (107-2) (107-3) exemplified in FIG. 9 are the reference information (107) that has been registered by the information registering equipment (102). Assuming that a plurality of reference information items are presented on the same display at a time as in this example, as the reference information (107), displaying titles in several words with URLs where their HTML documents (reference information (104) have been stored is preferable to directly displaying text documents or the like, because more information can be displayed at a time.

In cases where URLs are specified as the reference information (107), select the appropriate URL (103), then the HTML document that the URL points to is displayed on the information viewing equipment. For selecting an URL and displaying its HTML document, the same function is applied as the browser software for general PCs and therefore the drawing thereof is not shown. If the registered items of reference information (107) are so many that they cannot be displayed on one page, a page forward mechanism (107) and a page turn-back mechanism (903) may be employed so that the user can let the display page go forward and backward.

Figure 10:
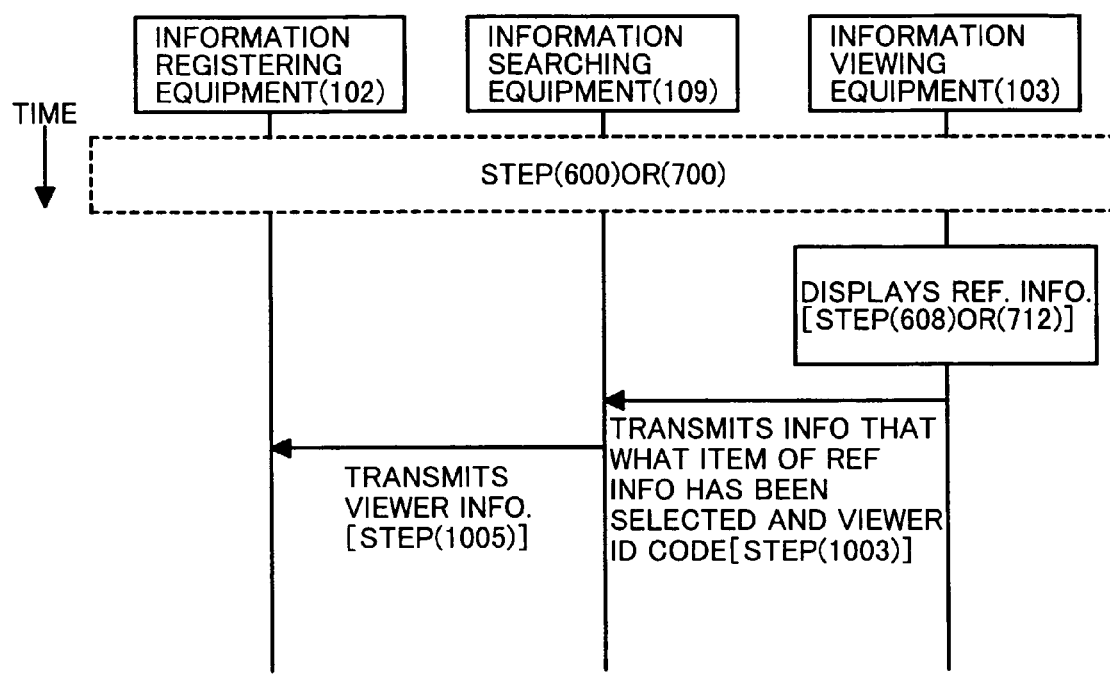
FIG. 10 illustrates an example of post-processing of information linking operation according to the present invention.

FIG. 10 illustrates an example of post-processing of information linking operation according to the present invention.

By carrying out the information linking operation shown in FIG. 6 or FIG. 7 (step (600) or step (700)), after the reference information (114) exemplified in FIG. 9 is displayed in step (608) or step (712), information (1001) that what item of reference information (107) has actually been selected by the viewer from among the reference information items (107-1), (107-2), (107-3) and the viewer ID code (1002), which will be explained later, are transmitted to the information search equipment (109) in step (1003) in FIG. 10. The information search equipment (109) transmits viewer information (1004) to the information registering equipment (102) that registered the selected item of reference information (107) in step (1005)

Hereon, the viewer information is data representing the identity and attributes of the viewer who selected the item of reference information (107), comprising the address, name, and age of the viewer, telephone number, e-mail address, yearly income, hobby, etc.

By feeding back of the attributes of the viewer to the information registrar, this post-processing can enhance the effectiveness of advertising for a commercial product and has an effect that the registrar's will to register information becomes stronger. Thus, transmitting the viewer information (1004) in the step (1005) may be performed as a service for which the information registrar is charged a fee.

FIG. 11 shows a system structural diagram of illustrative embodiment of implementing the post-processing illustrated in FIG. 10.

In this embodiment, as the first step, when initializing the information viewing equipment (103) at the first time use or the like, the viewer registers viewer information (1004) beforehand into a database (1101) for viewer information provided on the information search equipment (109). At this time, the viewer ID code (1002) is assigned to the information viewing equipment (103) from the information search equipment (109).

By carrying out the information linking operation shown in FIG. 6 or FIG. 7 (step (600) or step (700)), the reference information (114) as exemplified in FIG. 9 is transmitted from the information search equipment (109) to the information viewing equipment (103). When one of the reference information items (for example, (107-1)) is selected, information (1001) that what item of reference information (107) has been selected by the viewer from among the items on the reference information (114) and the viewer ID code (1002) are transmitted to the information search equipment (109). By viewer management means (1102) on the information search equipment, the viewer information is retrieved from the database (1101) for viewer information and transmitted to the information registering equipment (102). Thereby, transmitting the viewer information (1004) described in the above-mentioned step (1005) can be implemented.

The viewer management means (1102) and the database (1101) for viewer information can be embodied by using general database functions and therefore the drawing thereof is not shown.

FIG. 12 illustrates another example of a data record used for information search according to the present invention. The data record example shown in FIG. 12 includes a start time (1203) field replacing the field of time when content was broadcasted (403) shown in FIG. 4 and an end time (1204) field replacing the reserved field (404) shown in FIG. 4. This data record structure makes it possible to capture motion video frames with a finite time interval, specify the target position (406) and target area (407), and set up a link from the specified point/area to reference information (409).

With this modification, the descriptor (1201) changes from the binary value of "00000000" to another, for example, a binary value of "00000001" that indicates alteration to the data record contents.

Hereon, both fields of start time (1203) and end time (1204) contain the specifics of year, month, day, hours, minutes, seconds, frame number. The values in these fields respectively indicate the start time and the end time of broadcasting the content that is desired to link to reference information (409).

With the start time and the end time specified, the values of the target position (406) and target area (407) may be set to represent the full extent of display. This setting makes it possible to set linking such that, when the viewer selects any of the video frames from the start time to the end time of a program, the video frame is linked to its reference information (409).

To represent the full extent of display, the target position (406) and target area (407) may be defined by assigning special values (for example, all bits containing "1") to them.

FIG. 13 illustrates yet another data record example used for information search according to the present invention.

The data record example shown in FIG. 13 includes one couple or more of target position (1306) and target area (1307) fields replacing the reserved field (408) shown in FIG. 4. This data record structure makes it possible to set different target positions (1306-1) (1306-2) and target areas (1307-1) (1307-2) for a plurality of successive frames starting from the specified time when content was broadcasted (403), such as first frame information (1301) and second frame information (1302) shown in FIG. 13. This enables that, even if the subject display position moves in motion video sequence, linking to its reference information (409) will follow the change in position. The descriptor (1301) contains a flag indicating this data record structure (for example, a binary value of "00000010" and the number of successive frames. In FIG. 13, the number of successive frames is designated by a 5-bit binary value, but not limited to this; more bits may be assigned.

If frame information (1301) (1302) greatly increases so that it cannot be contained in one record set, it may be divided into a plurality of record sets and stored into the database (111).

FIG. 14 illustrates a further data record example used for information search according to the present invention.

The data record example shown in FIG. 14 includes a billing information (1408) field on the assumption that the information registrar is charged for registering reference information (409) and the viewer is charged for viewing the reference information (409). The descriptor (1401) is altered to indicate this data record structure.

The billing information (1408) field comprises, for example, the following sub-fields: account number (1410), registering fee (1411), viewing fee (1412), and term of validity (1413). The account number (1410) is the account of the information registrar who registered this data record to receive and pay charges: for example, the registrar's credit card number or the like is encrypted and stored in the account number sub-field. The registering fee (1411) is a charge (that is, an information registering fee) that is to be paid from the above account for registering this data record and this is used for calculating an information value (1601) which will be described later. The viewing fee (1412) is a charge (that is, an information viewing fee) that the viewer is to pay to the registrar through the above account for viewing the reference information (409) from this data record. The term of validity is a term during which this data record is valid. At its expiry, this data record is deleted from the database (111) (that is, it is excluded from the data for which search is performed). A new business using the present invention can be implemented in such a manner that all or part of charges that should actually be paid by the registrar and the viewer is paid to a service provider that operates the information search equipment (109). The billing information (1408) field does not necessarily include all the sub-fields (1410), (1411), (1412), and (1413). These sub-fields may be selectively provided for application or the like. The data record structures shown in FIGS. 4, 12, 13, and 14 are independent and a data record may be composed of fields from two or more record structures as required, wherein the bits (flag) of its descriptor should be set to designate its structure.

Figure 15:
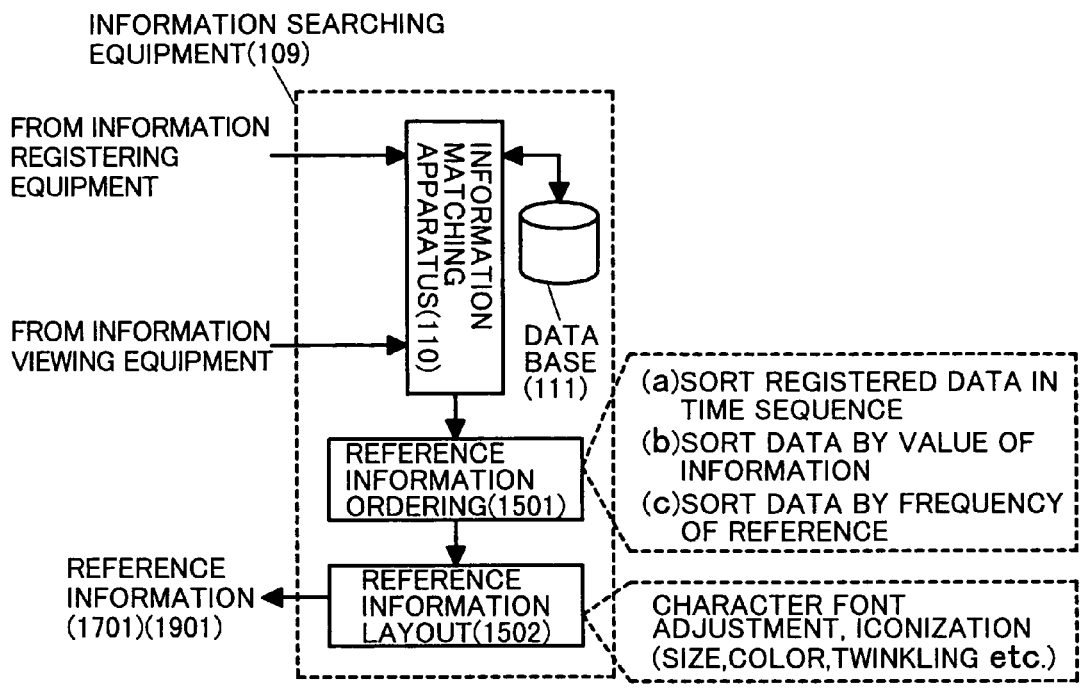
FIG. 15 shows a structural diagram illustrating another illustrative embodiment of the information search equipment (109) of the present invention.

FIG. 15 shows a structural diagram illustrating another illustrative embodiment of the information search equipment (109) of the present invention.

In FIG. 15, the reference information output from information matching apparatus (110) is displayed in the form shown in FIG. 9. To this output, its display form is arranged by using reference information ordering means (1501) and reference information layout means (1502) to generate new reference information items (1701) (1901). The reference information items (1701) (1901) generated after the arrangement will be explained later.

By the reference information ordering means (1501) shown in FIG. 15, the reference information items input from the information matching apparatus (110), sequenced as read from the database (111), are sorted (rearranged in another order) and output. The sorting ways include (a) sort registered data in time sequence, (b) sort data by value of information (1601), and (c) sort data by frequency of reference.

By applying these ways of sorting, an information item regarded as more significant for the viewer can be placed near the top among the items to be displayed and presented as the higher-priority one on the display.

Hereon, possible information items that could be regarded as more significant for the viewer are early and long registered reference information, newly registered reference information, reference information that the registrar registered with a high fee payment for its registration, reference information viewed by many people, and the like.

Sorting way (a) can be implemented by attaching data, date/time of registration specified in a reserved field (408) or the like shown in FIG. 4 to data records. Sorting way (b) will be explained later (see FIG. 16 and the explanation thereof). Sorting way (c) can be implemented as follows. A counter is provided in a reserved field (408) or the like shown in FIG. 4 to indicate the number of times the data has been referenced. The counter is incremented by one, each time the data is referenced. Each reference information item with its current value of the counter is input from the information matching apparatus (110) to the reference information ordering means (1501).

The reference information layout means (1502) shown in FIG. 15 adjusts the character font (size, color, twinkling, etc.) for describing information or attaches an icon (a small pictorial symbol) for attracting the viewer's attention to information, based on the priority obtained from the reference information ordering means (1501).

For example, the information item on the top line is written with characters of the greatest font (greatest point) among the items displayed, and the lower the line, the font size of the item becomes smaller. Besides, the top line information is made bright in twinkling red and an icon that indicates "recommendation" or the like is attached to the beginning of the top line. In this way, an information item that is more significant is displayed in appearance that attracts the viewer's attention. Accordingly, it can be expected that the viewer will select that information item for reference more frequently.

Conversely, such result can be expected that the registrar would pay a higher fee for registering information so that the registered information will be given higher priority, expecting that the viewer will select it more frequently.

The reference information ordering means (1501) and reference information layout means (1502) shown in FIG. 15 may be incorporated in the information viewing equipment (103) instead of the information search equipment (109). In this configuration, the information search equipment (109) sends the information viewing equipment (103) the reference information (114) and information necessary for ordering (time sequence of registered data, value of information, number of times the data has been referenced, etc.). This configuration would obviously have the same effect as described herein and the drawing thereof is not shown.

Figure 16:
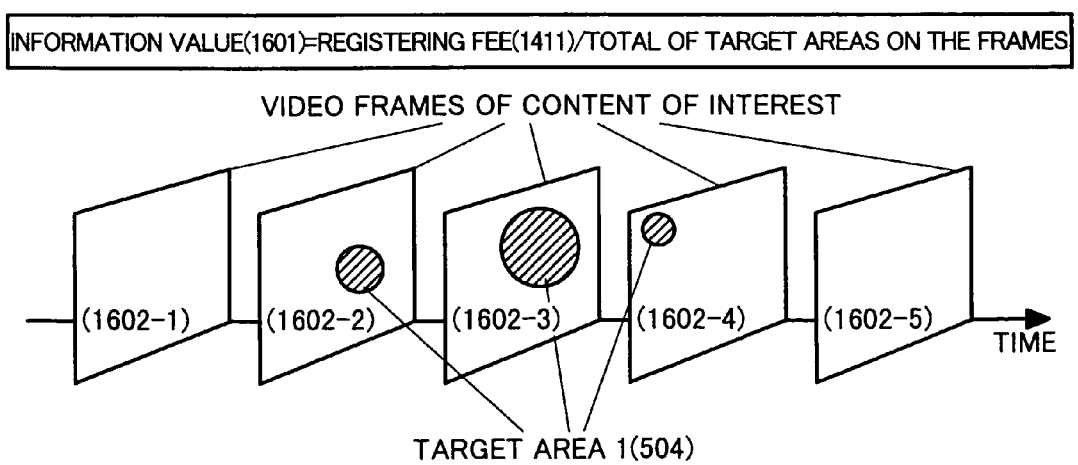
FIG. 16 illustrates an example of defining the value of information used for the billing method of the present invention.

FIG. 16 illustrates an example of defining the value of information (1601) used for the billing method of the present invention.

As shown in FIG. 13, it is possible to capture and link the content of interest (101) as video images on a plurality of successive frames to its reference information (107). As shown in FIG. 16, when capturing the video images, the target area 1 (504) set by the information registering equipment (102) generally increases or decreases in size, according to the size of the subject shown on the frames (1602-1) (1602-2) (1602-3) (1602-4) (1602-5) of the video content of interest (101).

Hereon, by defining information value (1601)=registering fee (1411)/(a total of target areas 1 (504) on the frames), the registering fee per unit area can be calculated. The higher the information value (1601), the higher will be the value of the reference information. The information can be expected to be more significant for the viewer.

The area used in this calculation may be replaced by the number of pixels or the like constituting the target area 1 (504).

Figure 17:
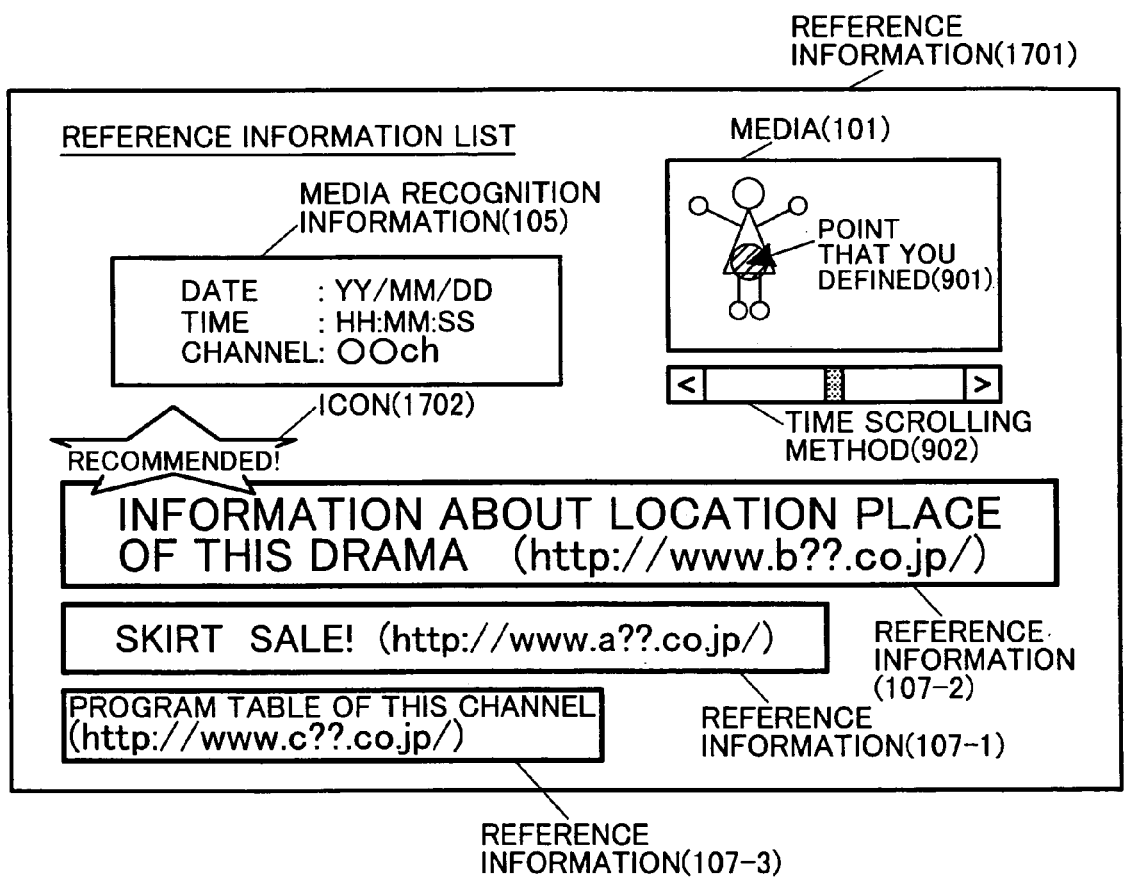
FIG. 17 illustrates yet another information example that is displayed on the information viewing equipment (103) of the present invention.

FIG. 17 illustrates an example of reference information (1701) output to the information viewing equipment (103) of the present invention. The display content shown in FIG. 17 is an example of the result of rearranging the reference information (114) illustrated in FIG. 9, according to the ordering of reference information items illustrated in FIG. 15.

In this example, the reference information items (107-2) (107-1) (107-3) are presented in this order after sorting. The information item on the top line is written with the greatest characters among the items displayed, and the lower the line, the character size of the item becomes smaller. Besides, a specific icon (1072) is attached to the beginning of the top line. Due to the ordering in this way, it can be expected that the viewer will select that information item for reference more frequently.

Figure 18:
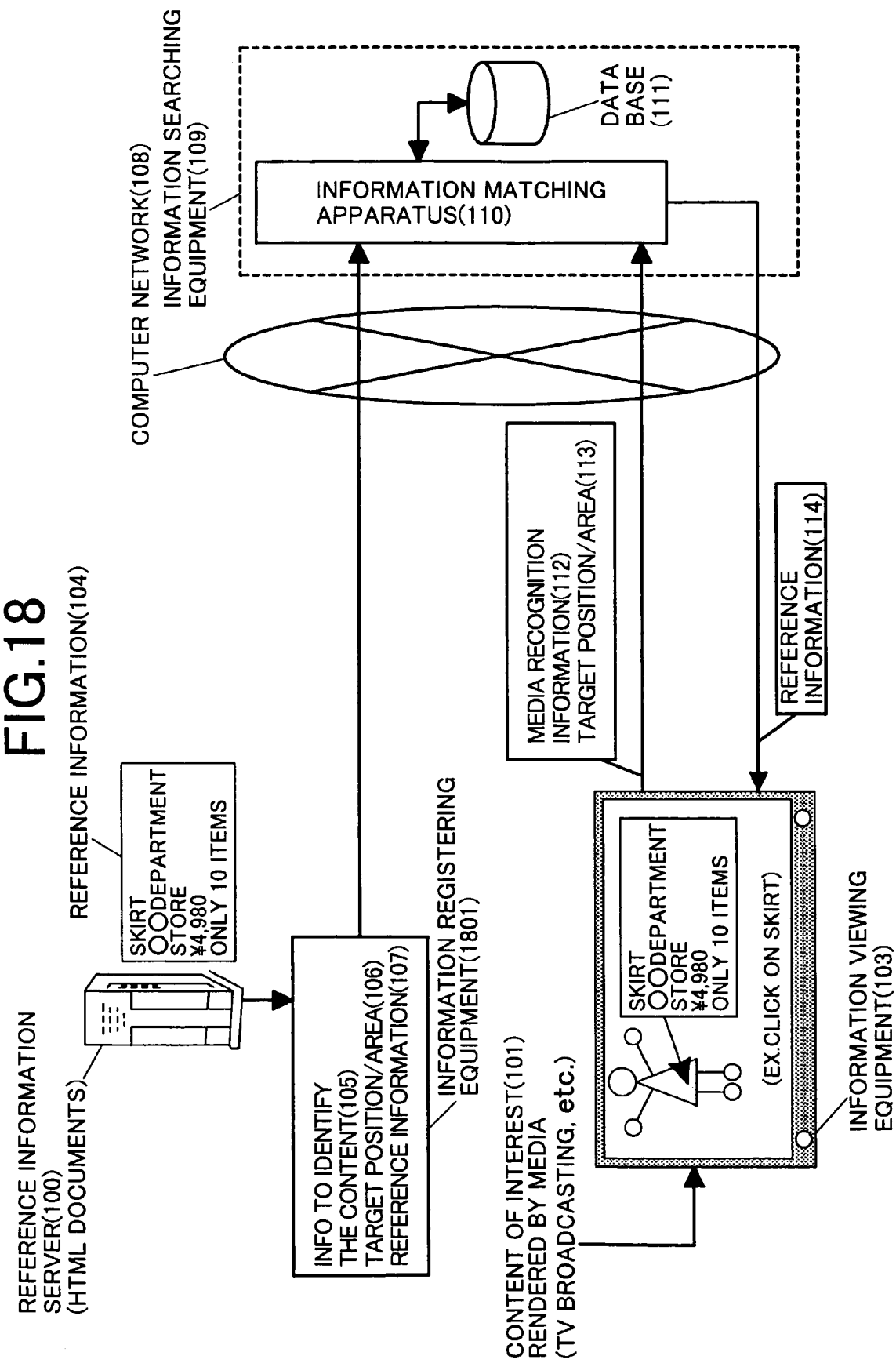
FIG. 18 shows a schematic structural drawing of another preferred embodiment of the present invention.

FIG. 18 shows a schematic structural drawing of another preferred embodiment of the present invention.

In FIG. 18, information registering equipment (1801) replaces the information registering equipment (102) in the structural drawing of the first preferred embodiment shown in FIG. 1.

If the start time (1203) and the end time (1204) of broadcasting a program are specified and the values of target position (406) and target area (407) are set to designate the full extent of display as part of the contents of a data record as exemplified in FIG. 12, the data to be set in all fields described in FIG. 12 can be prepared before the content of interest (101) is actually broadcasted, and therefore reference information (107) can be registered prior to the broadcasting of the content.

In this case, as shown in FIG. 18, the information to identify (105) the content of interest, target position/area (106), and reference information (107) should, preferably, be provided beforehand in the form of the data record exemplified in FIG. 12 and directly registered on the information search equipment (109) by sending them over the computer network (108).

Figure 19:
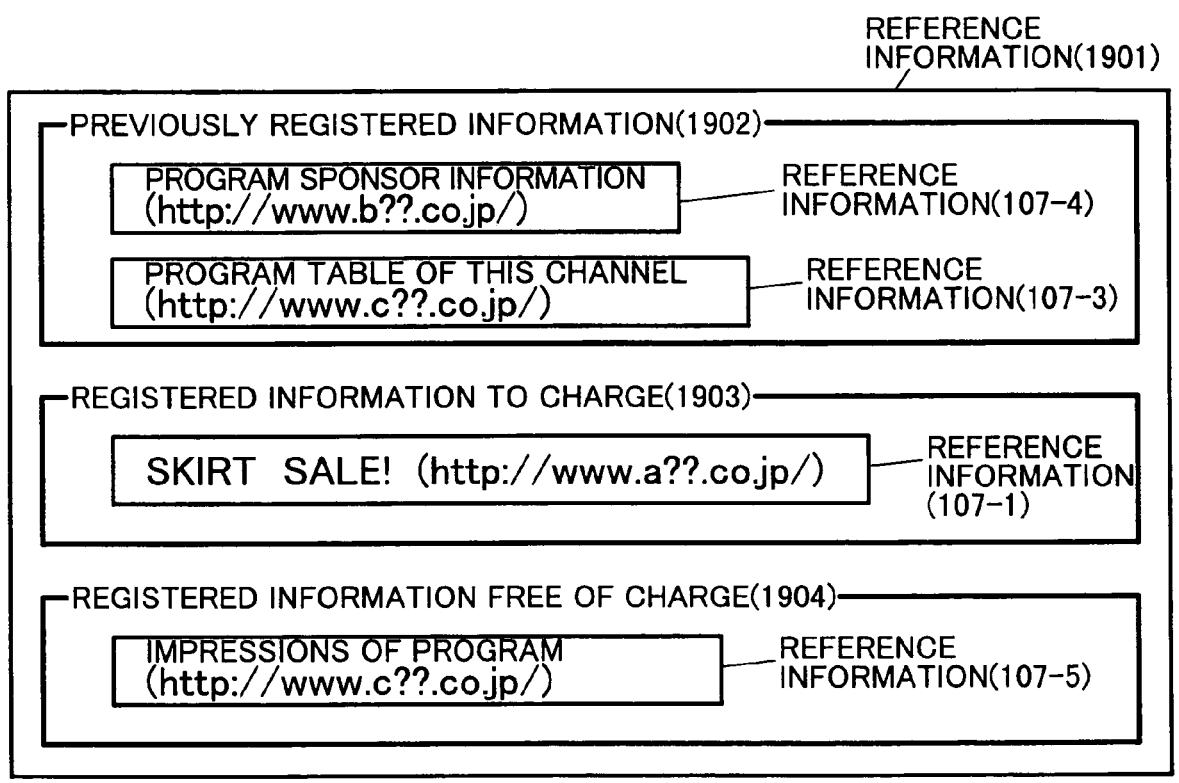
FIG. 19 illustrates a further information example that is displayed on the information viewing equipment (103) of the present invention.

FIG. 19 illustrates an example of reference information (1901) output to the information viewing equipment (103) of the present invention. The display content shown in FIG. 19 is an example of the result of sorting information items, according to the ordering of reference information items illustrated in FIG. 15, wherein the reference information (117) items are sorted under previous registered information (1902), registered information to charge for (1903), and registered information free of charge (1904) and presented on the display.

The previously registered information (1902) indicates that the reference information items (107-4) (107-3) have been registered prior to the time of actual broadcasting of the content of interest and that the information registrar probably has known the contents of the program beforehand. The registered information to charge for (1903) indicates that the information registrar has registered a reference information item (107-1) and paid the fee for registering the information. The registered information free of charge (1904) indicates that the information registrar has registered a reference information item (107-5) without paying the fee for registering the information. Presenting the reference information items sorted in this way makes it possible for the viewer to evaluate the usefulness of information to some extent before selecting an item of reference information (107).

Such result can be expected that the registrar would pay a higher fee for registering information so that the registered information will be given higher priority, expecting that the viewer will select it more frequently.

The above-described embodiments discussed illustrative cases where the content of interest (101) is rendered by general TV broadcasting using transmission media such as terrestrial broadcasting, broadcasting satellites, communications satellites, and cables. The present invention is not limited to these embodiments. In this invention, information (data) that is rendered in various modes is applicable, including motion and still video contents which are distributed across computer networks such as the Internet, motion and still video data for which where the content of interest is stored is definite as the information to identity the content, for example, the address of a general Web site/page on the Internet, and so on.

While the target area (407) was assumed as a circle and its size represented in terms of the radius length of, the circle to simplify the explanation in the above embodiments, other forms of the area are also conceivable. For example, complex forms of the target area would be numerically represented by AND operation and OR operation to calculate the length of the edges of a rectangle and a plurality of figures in combination. The thus obtained value would be set in the target area (407) field in the data record.

By applying the present invention, the following is made possible. When watching a TV program, only by selecting a part or all of an image shown on the TV receiver, even without entering some characters, other source information related to the image will be retrieved from the database and presented to the viewer.

As additional effect of the present invention, such information rendering service as a business would be feasible in such a manner as to profit by charging a fee for registering information and a fee for information retrieval.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. An information viewing equipment which links content of interest rendered by media to its reference information, and which is connected to an information searching equipment across a computer network, comprising:
    a capturing unit to capture said content of interest;
    an obtaining unit to obtain first content-identifying information to identify the content of interest from the captured content of interest;
    a transmitting unit to transmit the first content-identifying information to the information searching equipment across a computer network;
    a receiving unit to receive information across the computer network; and
    an outputting unit to output information based on the received reference information;
    wherein when the receiving unit receives reference information joined with second content-identifying information which is registered in a database of the information searching equipment and is judged to be matched with the first content-identifying information by the information searching equipment, the outputting unit outputs the received reference information,
    and wherein when the receiving unit receives notification information of unregistered data which informs that there is no reference information joined with second content-identifying information which is registered in a database of the information searching equipment that is judged to be matched with the first content-identifying information in the database of the information searching equipment, the outputting unit outputs a message which indicates that no reference information which the user of information viewing equipment searches is registered in the database of the information searching equipment.

2. An information viewing equipment according to claim 1, wherein said content of interest rendered by media is video image information distributed by TV broadcasting and said first content-identifying information are at least a broadcasting channel number over which and time when the content was or will be broadcasted.

3. An information viewing equipment according to claim 2, further comprising:

said obtaining unit obtains target-defining information that designates a part or all of a video image of interest distributed by the TV broadcasting; and said transmitting unit transmits the target-defining information joined with the first content-identifying information across the computer network.

4. An information viewing equipment according to claim 2, wherein said first content-identifying information includes a receiving area if the TV broadcasting is local TV broadcasting (restricted area broadcasting).

5. An information viewing equipment according to claim 2, further comprising:

a time-shifting apparatus for recording and reproducing said content of interest.

6. An information viewing equipment according to claim 2, wherein the reference information joined with the second content-identifying information is registered by an information registering equipment which transmits a set of the second content-identifying information and the reference information to the information searching equipment across the computer network.

7. An information viewing equipment according to claim 1, further comprising:

a time-shifting apparatus for recording and reproducing said content of interest.

8. An information viewing equipment according to claim 1, wherein the outputting unit outputs another message which requests setting of notification condition.

9. An information viewing equipment according to claim 1, wherein the outputting unit outputs other messages which indicate a plurality of conditions for notification from the information searching equipment to the information viewing equipment.

10. An information viewing equipment according to claim 9, wherein one of the said plurality of conditions is that no notification is needed even if the first content-identifying information matched with the second content-identifying information data is registered hereafter.

11. An information viewing equipment according to claim 10, wherein one of the said plurality of conditions is that the information searching equipment transmits notification to the information viewing equipment when the first content-identifying information matched with the second content-identifying information data is registered.

12. An information viewing equipment according to claim 10, wherein one of the said plurality of conditions is that the information searching equipment transmits notification to the information viewing equipment when first content-identifying information matched with the second content-identifying information data is registered.

13. An information viewing equipment according to claim 10, wherein the transmitting unit transmits notification information for one of said conditions which is selected in the information viewing equipment.

\* \* \* \* \*